No. 636,297. Patented Nov. 7, 1899.
J. I. SLOAN.
TOASTER.
(Application filed Feb. 9, 1898.)
(No Model.)
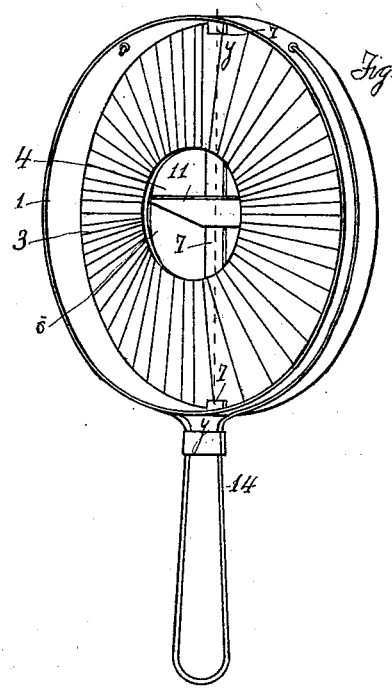
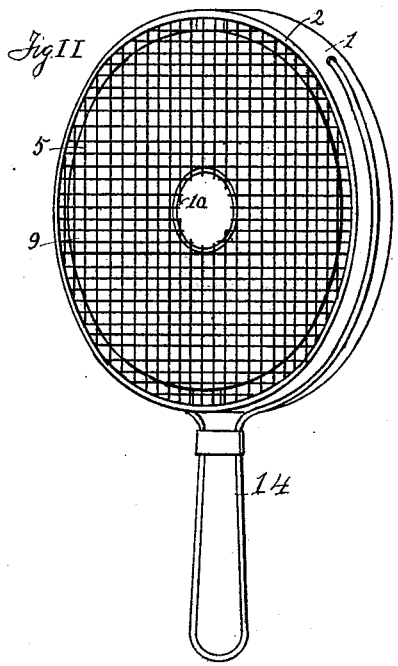
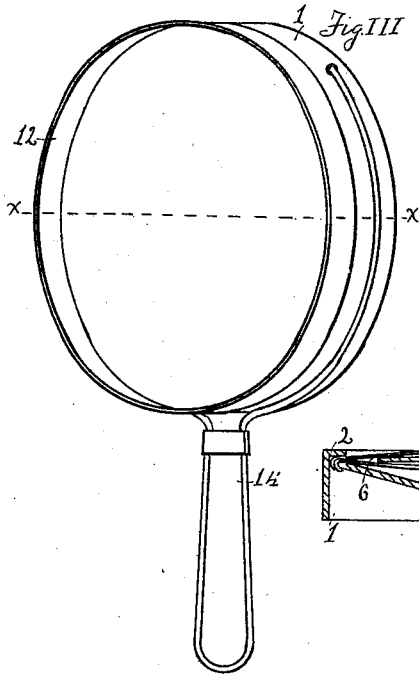
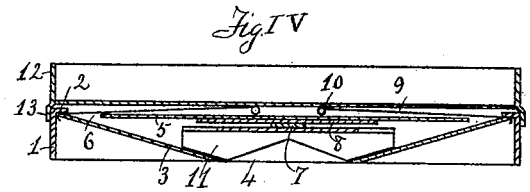
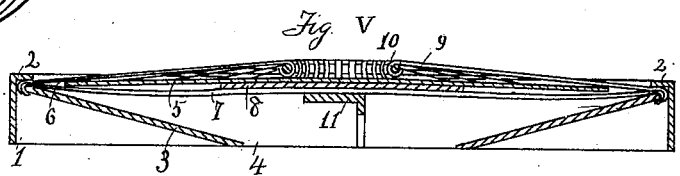
Witnesses
Inventor
J. I. Sloan

UNITED STATES PATENT OFFICE.

JAMES I. SLOAN, OF KANSAS CITY, KANSAS.

TOASTER.

SPECIFICATION forming part of Letters Patent No. 636,297, dated November 7, 1899.

Application filed February 9, 1898. Serial No. 669,625. (No model.)

*To all whom it may concern:*

Be it known that I, JAMES I. SLOAN, a citizen of the United States, residing at Kansas City, in the county of Wyandotte, in the State of Kansas, have invented certain new and useful Improvements in Toasters, of which the following is a full, clear, and exact description, reference being had to the accompanying drawings, which form a part of this specification.

My invention relates to improvements in toasters, having more particular reference to that class of toasters intended to be used over the flame of a gasolene-burner. It is a well-recognized difficulty in toasting over such a flame that that part of the bread to be toasted which lies directly over the flame may be properly toasted, while the other parts are scarcely at all affected by the heat from the flame, and to such an extent does this difficulty prevail that it is scarcely possible to get a slice of bread evenly and properly toasted over a flame, whether of a gas or gasolene or other burner, where the heat from the flame is to be utilized.

The object of my invention, then, is by a peculiar arrangement of the parts of the device to so deflect and distribute the flame and the heat therefrom that the extreme edges of a slice of bread placed thereon shall be subjected to the heat and toasted to the same extent as the more central portion directly over the burner; and to accomplish this object my invention consists in certain features of novelty hereinafter described, and pointed out in the claims.

Figure I represents a perspective view of the under side of a toaster embodying my invention. Fig. II represents a perspective view of the top side of the same. Fig. III represents a perspective view of the same provided with a pan for baking pancakes or other like uses. Fig. IV represents a cross-section on the line X X of Fig. III. Fig. V represents a cross-section on the line y y of Fig. I.

Similar numerals refer to similar parts throughout the several views.

1 represents a ring, made, preferably, of sheet metal, having its upper edge turned in, forming a narrow flange 2.

3 represents a cone-shaped distributer having an opening 4 at its apex, the outer edge of which engages the flange 2 of the ring, the opening 4 being about in the plane of the lower edge of the ring 1.

5 represents a deflector of such dimensions that between its outer edge and the flange 2 there is provided the open space 6. Said deflector is carried on the strap 7, the ends of which overlap the distributer 3, a plate 8 being interposed between the strap and the deflector to strengthen the deflector and further break up and deflect the heat directly over the opening 4 in the distributer.

9 represents a sheet of woven wire over the deflector 5, the outer edge of which is secured over the edge of the distributer 3. Near the center of this sheet of woven wire an opening is formed, and a ring 10 is provided, to which the broken ends of the wires are secured, said ring raising the sheet slightly off of the deflector and providing means for clearing the crumbs from the plate.

11 represents a bracket resting on the distributer, across the opening therein, and giving additional support to the deflector to prevent sagging thereof, and preferably with such relation thereto that the upper surface of said deflector shall be very slightly convex, as its center is pressed up by the bracket and its edge held down by the wire covering.

12 represents a shallow pan provided with a flange 13, arranged to be set on over the toaster when it is desired to use the same for pancakes or like purposes.

14 represents a handle connected with the ring 1 for lifting the toaster.

I am aware that toasters for gas-stoves have been made with a perforated diaphragm to prevent the flame from impinging on the toast or impregnating it with the gas; but I am not aware of any device for distributing the heat and flame evenly over all its parts. Hence

What I claim as my invention, and desire to secure by Letters Patent, is—

1. In a toaster the combination with a ring having a flanged edge, of a cone-shaped distributer having a central opening engaging the ring at the flanged edge, a deflector of smaller diameter than the ring carried on the distributer, a bracket resting on the distributer and supporting the deflector, and a sheet of woven wire secured upon the distributer and covering the deflector.

2. In a toaster the combination with a flanged ring, of a cone-shaped distributer having a central opening arranged within said ring, a deflector of smaller diameter than the ring arranged over the opening in said distributer, a sheet of woven wire having a central opening arranged over said deflector, and a ring around said opening to raise said wire off of the surface of said deflector, substantially as set forth.

3. In a toaster, the combination with a flanged ring, a cone-shaped distributer having a central opening arranged within the ring, a deflector of smaller diameter than the ring arranged over said opening in the distributer, a strap secured upon said distributer, carrying said deflector, a bracket resting on the distributer arranged to support said deflector, a sheet of woven wire having a central opening covering said deflector, and a ring surrounding said opening arranged to raise said wire off of the surface of the deflector, substantially as set forth.

JAMES I. SLOAN.

Witnesses:
JAMES H. MORLAN,
JOHN M. PARRY.